United States Patent [19]

Fultz et al.

[11] Patent Number: 5,005,693

[45] Date of Patent: Apr. 9, 1991

[54] LINE SHAFT ACCUMULATION CONVEYOR

[75] Inventors: William A. Fultz; David M. McLochlin, both of Louisville, Ky.

[73] Assignee: The Interlake Companies, Inc., Shepherdsville, Ky.

[21] Appl. No.: 512,818

[22] Filed: Apr. 23, 1990

[51] Int. Cl.$^5$ ............................................. B65G 13/06
[52] U.S. Cl. ..................................... 198/781; 198/790
[58] Field of Search ......................... 198/781, 789, 790

[56] References Cited

U.S. PATENT DOCUMENTS

| | | | |
|---|---|---|---|
| 2,531,913 | 11/1950 | Kaim | 188/75 |
| 3,465,850 | 9/1969 | Sexton | 188/75 |
| 3,650,375 | 3/1972 | Fleischauer et al. | 198/790 |
| 3,696,912 | 10/1972 | Fleischauer et al. | 198/781 |
| 3,729,088 | 4/1973 | Vom Stein et al. | 198/781 |
| 3,840,110 | 10/1974 | Molt et al. | 198/781 |
| 4,164,998 | 8/1979 | De Good et al. | 198/781 |
| 4,193,492 | 3/1980 | Hammond | 198/781 |
| 4,196,312 | 4/1980 | De Good et al. | 198/781 |
| 4,355,715 | 10/1982 | Chorlton | 198/781 |
| 4,362,238 | 12/1982 | Rivette | 198/781 |
| 4,372,442 | 2/1983 | Fleischauer | 198/790 |
| 4,819,788 | 4/1989 | Van Der Schie | 198/781 |
| 4,887,707 | 12/1989 | Harms | 198/781 |

Primary Examiner—Robert P. Olszewski
Assistant Examiner—Cheryl L. Gastineau
Attorney, Agent, or Firm—Theresa Fritz Camoriano

[57] ABSTRACT

A lineshaft-driven accumulation conveyor includes a plurality of intermediate shafts which run parallel to the drive shaft and are independently driven from the drive shaft, each of the intermediate shafts driving a zone of conveyor rollers.

3 Claims, 2 Drawing Sheets

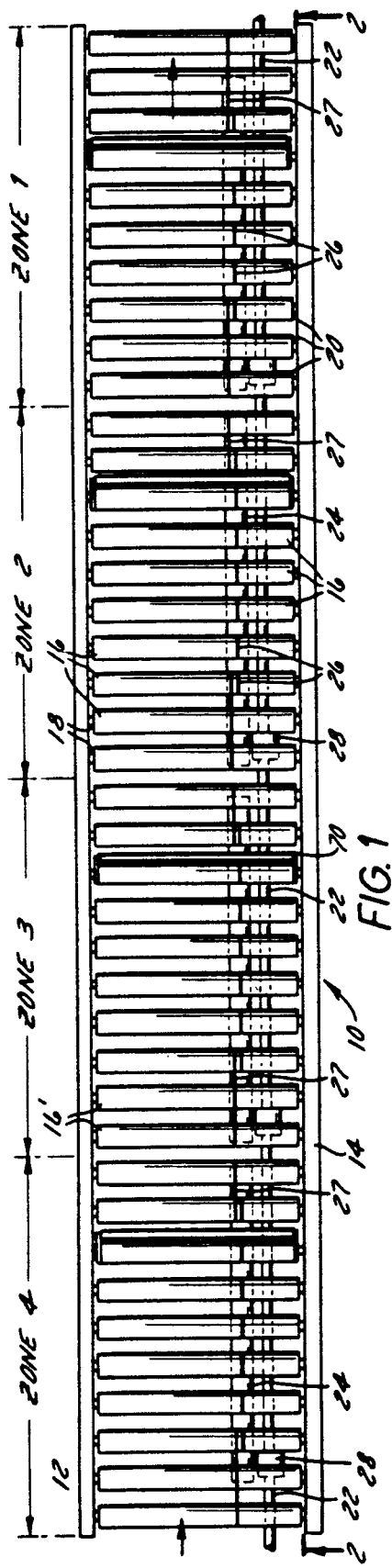
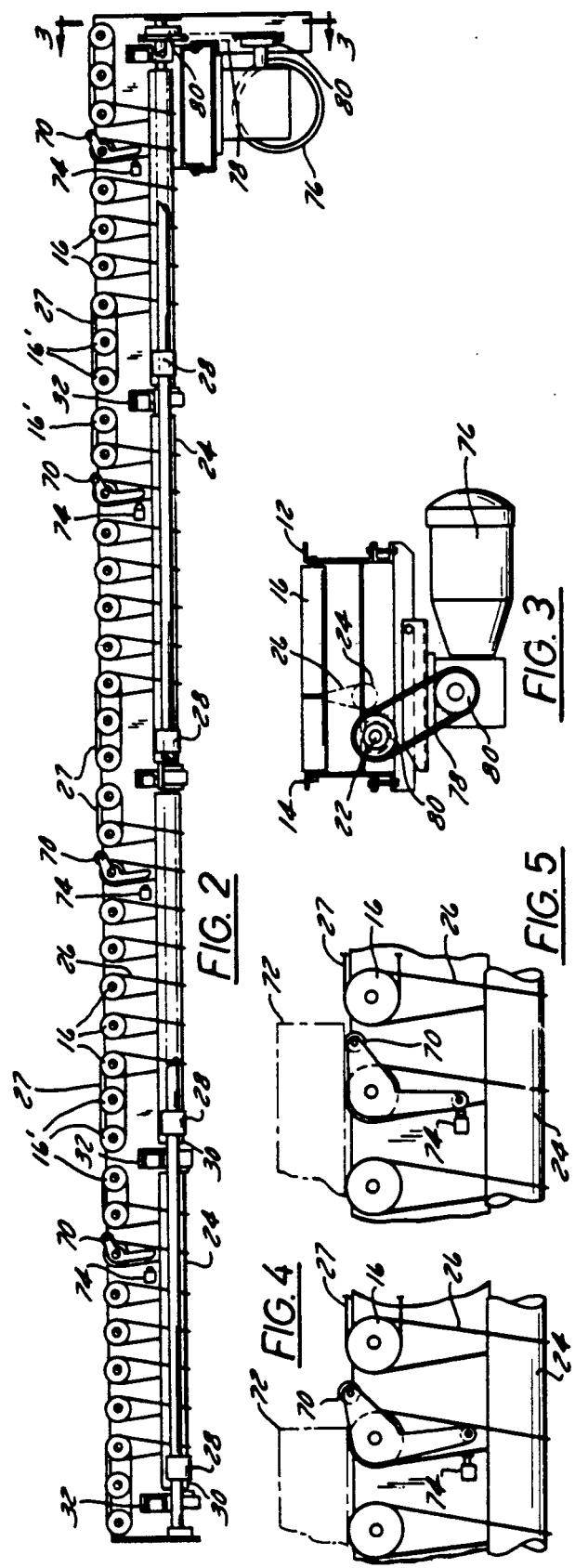
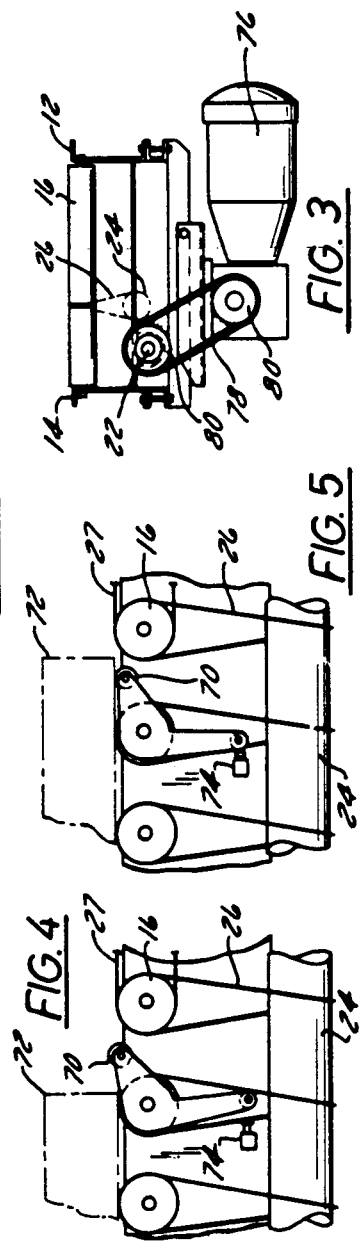
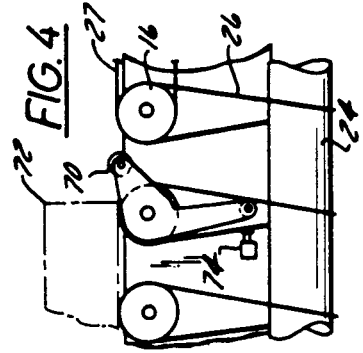

LINE SHAFT ACCUMULATION CONVEYOR

BACKGROUND OF THE INVENTION

The present invention relates to conveyors, and, in particular, to a conveyor which is driven by a line shaft and which is divided into zones, such that the zones can be selectively driven or stopped.

There are many situations in which an accumulation conveyor is needed. For instance, if there is a blockage or a back-up in the conveyor line, articles can begin to bump into each other, with the line pressure increasing as the number of articles pushing on the front-most article increases, so that the articles in the front of the blockage tend to be crushed and damaged. When an accumulation conveyor is available in that situation, it senses the blockage or back-up, and the zones leading up to the blockage stop being driven as articles arrive in them, so that articles are accumulated on the conveyor without crushing each other. When the blockage is removed, the zones again begin driving, in order to convey the articles along their intended path.

Line shaft driven conveyors are very popular, because they require only a single drive for the entire conveyor, and a good accumulation arrangement for this type of conveyor is needed. U.S. Pat. No. 4,819,788 "Van Der Schie" shows a line shaft type of conveyor which has been adapted to function as an accumulation conveyor. In the Van Der Schie patent, a plurality of tubes surround the drive shaft. The tubes are normally driven along with the drive shaft, due to friction between the tube and the drive shaft. Each tube has a plurality of O-rings wrapped around it, with each O-ring also being wrapped around its respective roller. The group of rollers driven by any given tube defines a zone. Under normal conditions, when the drive shaft rotates, the tubes rotate, causing the O-rings to drive their rollers. However, if accumulation is desired, a brake is applied to the tube of the zone for which driving is to be stopped. Then, the drive shaft continues to rotate, but the brake prevents the respective tube from rotating with the drive shaft.

This arrangement wastes energy, because the drive shaft is trying to drive the tubes all the time, even when the tubes do not rotate. In addition, the wasted energy becomes heat, which must be dissipated somewhere in the conveyor. Also, the continuous friction between the parts tends to make the parts wear out.

Another problem with the Van Der Schie design is that, when one of the O-rings breaks and has to be replaced, it is necessary to disconnect the entire drive shaft, slide the new O-ring over the drive shaft, and then realign all the drive shaft pieces again. This means that considerable maintenance work is required to keep the conveyor operating, and it means that there will be a considerable amount of down-time for the conveyor. When a conveyor is shut down, it may cause an entire manufacturing or distribution process to shut down, so minimizing the amount of down-time for maintenance can be a tremendous cost savings.

SUMMARY OF THE INVENTION

The present invention solves many of the problems of the prior art, while, at the same time, providing an accumulating conveyor which is compatible with the standard, popular line shaft conveyor.

In the present invention, the drive is disconnected from the zones which are in the accumulation mode (not being driven). This conserves energy, avoids the problem of dissipating the waste heat, and avoids the problem of wearing out parts that are being subjected to the heat and friction when the zone is accumulating.

In the present invention, replacing a broken O-ring is a much simpler process than in the prior art. Instead of having to disconnect the entire drive shaft, it is only necessary to disconnect the short, intermediate roller for the zone in which the O-ring is located. This is a very quick and simple process, requiring very little labor and down-time. Thus, the present invention provides a substantial cost savings for the business which uses it in its process.

The present invention provides a lineshaft accumulation conveyor with a simple design, which is relatively inexpensive to build and easy to maintain.

BRIEF DESCRIPTION OF THE DRAWINGS

FIG. 1 is a top plan view of the accumulation conveyor of the present invention;

FIG. 2 is a view along the section 2—2 of FIG. 1;

FIG. 3 is a view along the section 3—3 of FIG. 2;

FIG. 4 is an enlarged view of a portion of FIG. 2, showing a package approaching a sensor mechanism;

FIG. 5 is the same view as FIG. 4, with the package on top of the sensor mechanism;

DESCRIPTION OF THE PREFERRED EMBODIMENT

Figure 6:
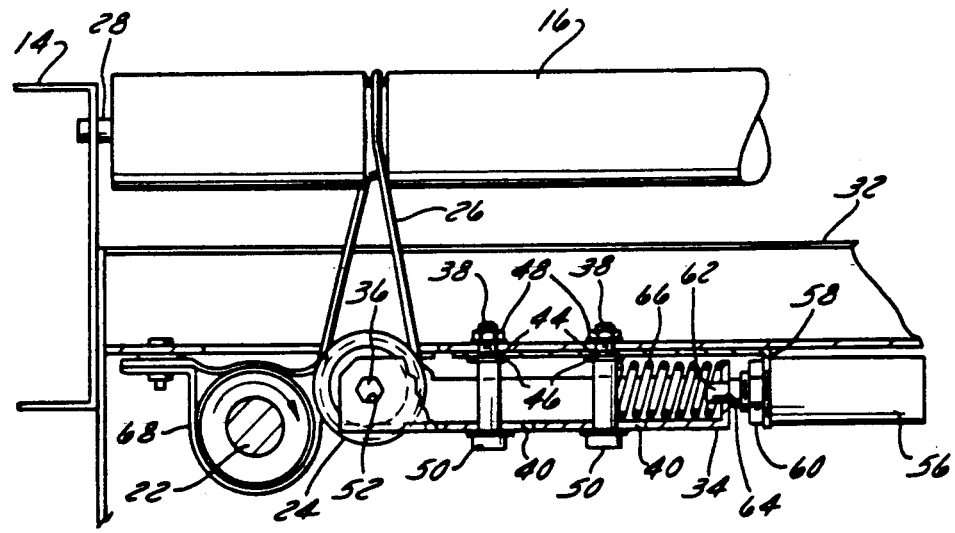
FIG. 6 is a sectional view of the conveyor of FIG. 1, showing the intermediate shaft out of contact with its respective friction wheel.

Referring first to FIG. 1, the present invention is a lineshaft accumulation conveyor 10, which has a conveyor frame made up of a first side rail 12 and a second side rail 14. The conveyor 10 includes a plurality of conveyor rollers 16, each of which has a first end 18 mounted on the first side rail 12 and a second end 20 mounted on the second side rail 14.

The conveyor shown in FIG. 1 is divided into four zones, each of which is driven independently of the other zones. In other words, each zone can be driven or stopped regardless of whether the other zones are being driven. It is expected that, to the left of this accumulation conveyor 10 will be a standard lineshaft conveyor (not shown) in which the conveyor rollers are driven from the drive shaft by O-rings, and, to the right of this accumulation section 10 will probably also be a standard lineshaft conveyor (not shown). Articles will be conveyed from left to right across the accumulation conveyor 10.

A drive shaft 22 extends along the entire conveyor, including the sections of conveyor before and after the accumulation conveyor 10, so the entire conveyor is driven by a single drive. The axis of the drive shaft 22 is substantially parallel to the side rails 12, 14. A plurality of intermediate shafts 24 are aligned along an axis which is substantially parallel to the axis of the drive shaft 22 but which is also distinct from the axis of the drive shaft 22, so that the intermediate shafts 24 are spaced a distance away from the drive shaft 22.

Each intermediate shaft 24 lies below a zone of rollers 24, and, as shown in FIG. 2, a plurality of O-rings 26, which function as drive belts, are looped around each intermediate shaft 24, with each O-ring extending around its respective conveyor roller 16. The O-rings fit into grooves in the intermediate shaft 24 and in their respective roller 16. Thus, when an intermediate shaft 24 rotates, it drives its zone of conveyor rollers 16 by means of the O-rings 26. Some of the conveyor rollers 16' in each zone are not driven directly from the intermediate shaft 24 but are driven by means of O-rings 27 from other conveyor rollers 16.

As shown in FIGS. 1 and 2, the drive shaft 22 has a plurality of friction wheels 28 mounted on it, so that the friction wheels 28 rotate with the drive shaft 22. There is a friction wheel 28 mounted on the drive shaft 22 near the back shaft end 30 of each intermediate shaft 24.

Support beams 32 extend across the conveyor frame, from first side rail 12 to second side rail 14 at intervals along the accumulation conveyor 10. These support beams 32 are seen in FIGS. 2 and 6–8. Each support beam 32 is welded or bolted to the conveyor frame on both sides and lies below the conveyor rollers 16 so as not to interfere with the rollers 16. These support beams 32 are used to mount the intermediate shafts 24 on the conveyor and to support the drive shaft 22 at intervals along the length of the accumulating conveyor 10.

Figure 7:
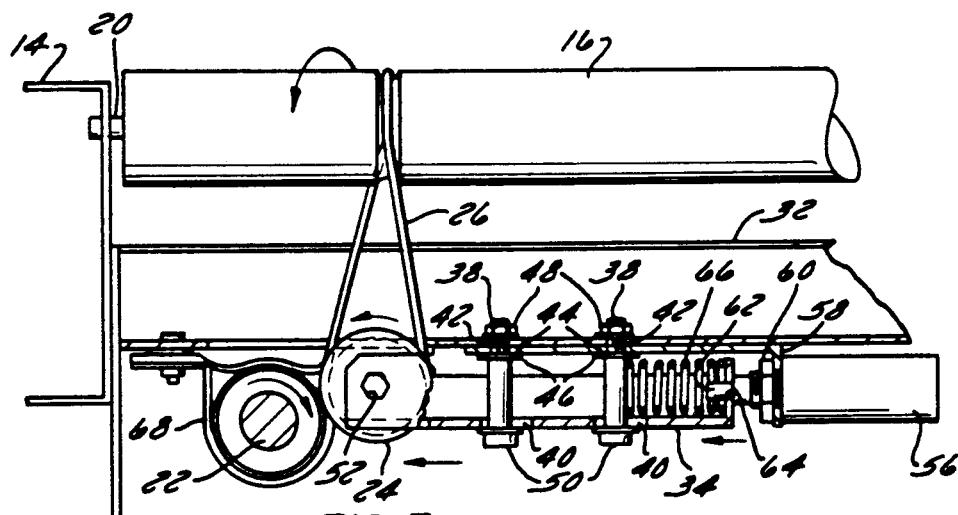
FIG. 7 is the same view as FIG. 6, except that the intermediate shaft has now been moved into contact with the friction wheel.
Figure 8:
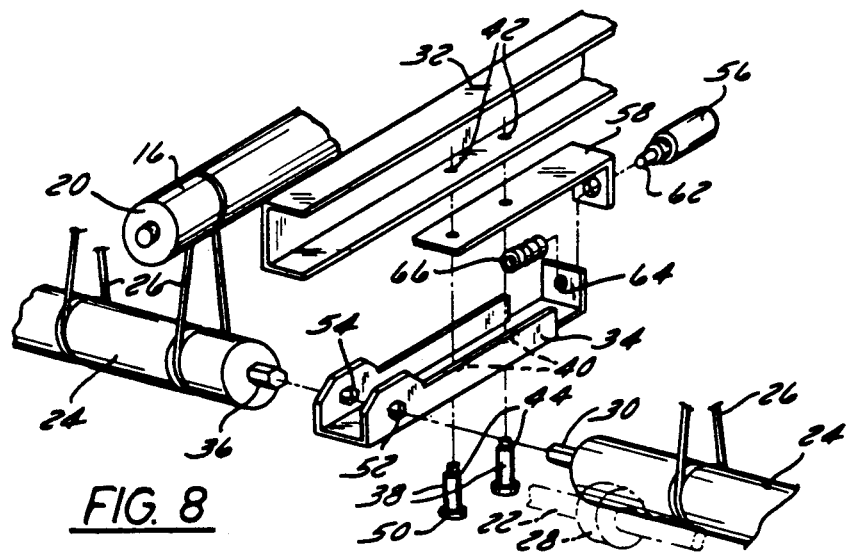
FIG. 8 is a broken away exploded perspective view showing the manner in which two adjacent intermediate shaft portions are mounted on the conveyor.

As shown best in FIGS. 6–8, the support beam 32 has a trough-shaped bracket 34 slidably mounted on it, on which are mounted the back end 30 of one intermediate shaft 24 and the forward end 36 of the next adjacent intermediate shaft 24. The slidable bracket 34 is mounted onto the support beam 32 by means of two bolts 38 which pass through slots 40 in the slidable bracket 34 and through holes 42 in the support beam 32. The bolts 38 define a step 44 near their threaded ends. The step 44 is preferably larger than the diameter of the holes 42 in the support beam 32 or is at least larger than the diameter of the threaded end of the bolts, so that a washer 46 can be supported on the step 44 so that when nuts 48 are tightened down on the bolts 38, the bolts are held tight to the support beam 32 while leaving the slidable bracket 34 free to slide from side to side relative to the support beam 32.

The slots 40 on the slidable bracket 34 are elongated in the direction of travel of the slidable bracket 34, which is from left to right in FIGS. 6 and 7, or from side to side of the conveyor. The width across the slots 40 is preferably not wider than the heads 50 of the mounting bolts 38. In this manner, the heads 50 of the bolts 38 or washers supported on the heads 50 support the slidable bracket 34 in a vertical direction, and the shank of the bolts 38 prevents the slidable bracket from moving forward or backward, so the motion of the slidable bracket is limited to sliding along the length of the slots 40, which is the left to right direction in FIGS. 6 and 7.

At the end of the slidable bracket 34 nearest the second side rail 14 are two apertures 52, 54, seen best in FIG. 8. These apertures 52, 54 are non-circular in crossection. In this case, the apertures are hexagonal, corresponding to the hexagonal shape of the shaft ends of the intermediate shafts 24. The intermediate shafts 24 are actually standard spring-loaded conveyor rollers, in which the shaft ends can be pushed into the body of the roller and are then returned to their normal extended position by a spring which is inside the roller. In order to mount the intermediate shafts 24 on the slidable bracket 34, the shaft ends of the intermediate shafts 24 are retracted, the shafts 24 are aligned with their respective hexagonal apertures 52 or 54 in the slidable bracket 34, and the shaft ends are then released, so the shaft ends project through their respective apertures 52 or 54. So, when the intermediate shafts 24 are properly mounted on their respective slidable brackets 34, the rear shaft end 30 of one intermediate shaft 24 extends through the forward aperture 52 of the slidable bracket, and the forward shaft end 36 of the next adjacent intermediate shaft 24 extends through the rear aperture 54 of the same slidable bracket 34. All the slidable brackets 34 are mounted substantially the same distance from the second side rail 14, and all the slidable brackets 34 are the same size, so the intermediate shafts 24 lie substantially along a single axis.

The shaft ends 30, 36 of the intermediate shafts 24 are fixed on the slidable brackets 34, and the central portions of the intermediate shafts 24 (the roller portions) are free to rotate relative to the ends 30, 36. Thus, the intermediate shafts 24 can move in the side-to-side direction of the conveyor (left to right in FIGS. 6 and 7), while also rotating about their respective axes.

The movement of the slidable brackets 34 from left to right is caused by a piston and cylinder arrangement 56, which is mounted on the support beam 32. The cylinder 56 is fixed to the support beam 32 by means of the bracket 58, which is attached to the cylinder 56 by the nut 60 and is attached to the support arm by the same bolts 38 which support the slidable bracket 34. The piston rod 62 projects through an aperture 64 in the end of the slidable bracket 34 and is secured on the other side by means of a clip or pin or some other known means (not shown). A spring 66 lies between the end of the slidable bracket 34 and the first mounting bolt 38 and serves to return the piston rod 62 and the slidable bracket to the retracted or inward position.

The drive shaft 22 is also supported on the support beam 32 by bearings 68 (seen in FIGS. 6 and 7) which are bolted to the support beam 32. Each bearing 68 lies several inches behind each friction wheel 28 and therefore does not interfere with the contact between the intermediate shaft 24 and its respective friction wheel 28.

In the present embodiment, the articles moving along the accumulating conveyor 10 are sensed by sensor bars 70. A sensor bar 70 lies near the forward end of each zone. Each sensor bar 70 is mounted on one of the conveyor rollers 16 and pivots about the axis of its conveyor roller 16. As shown in FIGS. 2 and 4, the sensor bars 70 normally have a top surface which is slightly above the top surface of the conveyor rollers 16. When a package 72 or other article moves over the sensor bar 70, it pushes the top of the sensor bar 70 down, causing the sensor bar 70 to pivot about its axis, as shown in FIG. 5. This causes the lower end of the sensor bar 70 to pivot into contact with a switch 74, which tells the controller that there is an article on the conveyor at that point. The logic mechanism for controlling the driving of the various zones of the accumulation conveyor 10 will not be discussed here, because many such mechanisms are known which would work well in this conveyor. Also, the sensor bars could be replaced by other types of sensors known in the industry.

FIG. 3 shows the motor 76 which drives the drive shaft 22 by means of a chain 78 and sprockets 80.

Operation of the accumulation conveyor shown in the drawings is as follows:

The drive shaft 22 is continuously driven by the motor 76. During normal operation, air is supplied to all of the cylinders 56 from a source of pressurized air (not shown), which causes the piston rods 62 to be extended as shown in FIG. 7, sliding all of the slidable brackets 34 toward the second side rail 14, and bringing all of the intermediate shafts 24 into contact with their friction wheels 28. The friction between the friction wheels 28 and their respective intermediate shafts 24 causes the intermediate shafts 24 to rotate, which drives the O-rings 26, which, in turn, drive all of the conveyor rollers 16 in the accumulation conveyor 10.

Articles will be moving from left to right across the conveyor 10, riding on the driven conveyor rollers 16. When there is a back-up or an obstruction somewhere in the conveyor system, the controller will call on the accumulation conveyor 10 to begin accumulating articles.

As mentioned earlier, there are several types of control systems that could be used in this conveyor. What is described here is only an example. Suppose there is an article in Zone 1, pushing down the sensor bar 70 in that zone and activating the switch or valve 74 in that zone. Now, suppose there is also an article in Zone 2, pushing down the sensor bar 70 in Zone 2. In one known mode for controlling accumulation conveyors, this condition would cause the controller to tell Zone 2 to stop driving. In this conveyor, that means that a valve (not shown), which is in communication with the cylinder 56 in zone 2, would open, permitting the spring 66 to push the slidable bracket 34 toward the first side rail 12, returning the piston rod 62 into the cylinder 56, and exhausting the air from the cylinder 56. This moves the back end 30 of the intermediate shaft 24 of zone 2 out of contact with its friction wheel 28, so zone 2 stops driving. This also moves the front end 36 of the intermediate shaft 24 in zone 3 slightly out of alignment with the axes of the other intermediate shafts 24, but it does not affect the contact between the back end of the zone 3 intermediate shaft 24 and its friction wheel 28, so zone 3 and zone 4 will continue to be driven.

As articles back up on the accumulating conveyor 10, the controller will cause other zones to stop driving as well, by causing their intermediate shafts to move out of engagement with their respective friction wheels. Then, when the blockage is removed, the controller will tell the zones to start driving again. This will be accomplished by causing air to enter the cylinders 56, which causes the piston rods 62 to move outward, sliding the slidable brackets 34 toward the second side rail 14, and bringing the intermediate shafts 24 back into contact with their respective friction wheels, so the zones begin driving again.

If an O-ring in the accumulating conveyor 10 breaks or wears so that it needs to be replaced, it is not necessary to disconnect the drive shaft at all. All that is required is to push in on the spring-loaded end of the conveyor roller 16 to remove it from one of the side rails and push in on the spring-loaded end of the intermediate shaft 24 on which that O-ring fits, causing the intermediate shaft 24 to be disengaged from its slidable bracket 34 at one end. Then the old O-rings can easily be removed and new ones installed, in a very short time. To reassemble, all that is required is that one end of the roller 16 and one end of the intermediate shaft 24 be aligned with their respective apertures, and the spring-loaded shafts will pop right back into position, ready to go again.

It will be obvious to those of ordinary skill in the art that modifications may be made to the embodiment described above without departing from the scope of the present invention.

What is claimed is:

1. An accumulation conveyor comprising:
    a conveyor frame including first and second side rails and a plurality of rollers each having a first end mounted on the first side rail and a second end mounted on the second side rail;
    a drive shaft extending along the conveyor and defining an axis which is substantially parallel to the side rails;
    a plurality of intermediate shafts extending parallel to the drive shaft, said intermediate shafts being aligned with each other along an axis which is distinct from the axis of the drive shaft, each of said intermediate shafts lying adjacent to a distinct group of rollers so as to define a zone of rollers associated with each intermediate shaft;
    a plurality of drive belts wrapped around each of the intermediate shafts, each of said drive belts also being wrapped around its respective roller such that, when an intermediate shaft rotates, it drives the drive belts that are wrapped around it, which, in turn, drive the rollers in the zone of rollers associated with that intermediate shaft;
    a plurality of friction wheels mounted on the drive shaft, each of said friction wheels lying adjacent to its respective intermediate shaft; and
    means for moving each intermediate shaft toward and away from its respective friction wheel, such that, when each intermediate shaft contacts one of the friction wheels of the drive shaft, it is driven by the drive shaft, which, in turn, causes the zone associated with that intermediate shaft to be driven, and, when that intermediate shaft is moved away from the friction wheel, it stops driving its zone of rollers.

2. An accumulation conveyor as recited in claim 1, wherein said means for moving each intermediate shaft includes a piston and cylinder arrangement mounted on the conveyor frame and connected to the intermediate shaft, said piston cylinder arrangement including a piston rod which moves in and out of the cylinder so that, when the piston rod moves in and out of the cylinder, the intermediate shaft moves into and out of contact with its friction wheel.

3. An accumulation conveyor as recited in claim 2, and further comprising means for mounting each intermediate shaft on the conveyor frame, each intermediate shaft defining a forward end and a back end, said mounting means including:
    a support beam mounted on the conveyor frame below the conveyor rollers 16;
    a bracket slidably mounted on said support beam and fixed to the piston rod so as to move back and forth with the piston rod;
    wherein the forward end of one intermediate shaft and the back end of the next adjacent intermediate shaft are mounted on the slidable bracket.

* * * * *